(12) United States Patent
Jogi et al.

(10) Patent No.: US 7,911,879 B2
(45) Date of Patent: Mar. 22, 2011

(54) METHOD OF DETECTING SIGNALS IN ACOUSTIC DRILL STRING TELEMETRY

(75) Inventors: Pushkar Jogi, Houston, TX (US); John Kingman, Grand Junction, CO (US)

(73) Assignee: Baker Hughes Incorporated, Houston, TX (US)

( * ) Notice: Subject to any disclaimer, the term of this patent is extended or adjusted under 35 U.S.C. 154(b) by 800 days.

(21) Appl. No.: 11/855,053

(22) Filed: Sep. 13, 2007

(65) Prior Publication Data

US 2008/0056067 A1 Mar. 6, 2008

Related U.S. Application Data

(63) Continuation of application No. 10/412,915, filed on Apr. 14, 2003, now abandoned.

(60) Provisional application No. 60/376,637, filed on Apr. 30, 2002.

(51) Int. Cl.
E21B 47/16 (2006.01)
(52) U.S. Cl. ...................... 367/82; 340/855.6; 73/152.15
(58) Field of Classification Search .............. 340/855.6, 340/855.5, 855.7, 856.1, 856.2; 367/81–83; 73/152.15–152.17; 75/40
See application file for complete search history.

(56) References Cited

U.S. PATENT DOCUMENTS

| | | | |
|---|---|---|---|
| 4,715,451 A | 12/1987 | Bseisu et al. | |
| 4,992,997 A | 2/1991 | Bseisu | |
| 5,128,901 A | 7/1992 | Drumheller | |
| 5,130,951 A | 7/1992 | Kingman | |
| 5,151,882 A | 9/1992 | Kingman | |
| 5,303,203 A | 4/1994 | Kingman | |
| 5,477,505 A | 12/1995 | Drumheller | |
| 5,639,997 A | 6/1997 | Mallett | |
| 5,969,638 A | 10/1999 | Chin | |
| 6,023,658 A * | 2/2000 | Jeffryes | 702/16 |
| 6,320,820 B1 * | 11/2001 | Gardner et al. | 367/81 |
| 6,370,082 B1 * | 4/2002 | Gardner et al. | 367/82 |
| 6,657,597 B2 * | 12/2003 | Rodney et al. | 343/719 |
| 6,741,185 B2 * | 5/2004 | Shi et al. | 340/853.2 |
| 6,768,214 B2 | 7/2004 | Schultz et al. | |

(Continued)

FOREIGN PATENT DOCUMENTS

EP 0565141 A2 10/1993

(Continued)

OTHER PUBLICATIONS

Hyun Yup Lee: Orillstring Axial Vibration and Wave Propagation in Boreholes, Submitted to the Department of Ocean Engineering, Massachusetts Institute of Technology, May 15, 1991,pp. 1-167, Partial Fulfillment of the Requirements for the Degree of Doctor of Philosophy.

(Continued)

Primary Examiner — Albert K Wong
(74) Attorney, Agent, or Firm — Cantor Colburn LLP

(57) ABSTRACT

A method of acoustic telemetry in a drill string in a wellbore, comprises; transmitting an acoustic signal related to a parameter of interest from a transmitting location into the drill string; detecting signals propagated through the drill string at a receiving location, where the detected signals including noise; determining a drill string transfer matrix defining the propagation of signals through a transfer interval between the receiving location and the transmitting location; and using the detected signals and the drill string transfer matrix for obtaining an estimate of the acoustic signal.

13 Claims, 3 Drawing Sheets

U.S. PATENT DOCUMENTS 6,781,520 B1 * 8/2004 Smith et al. .................. 340/853.1
6,940,420 B2 9/2005 Jenkins
7,324,010 B2 * 1/2008 Gardner et al. ............ 340/854.4

FOREIGN PATENT DOCUMENTS

EP 0588401 A2 3/1994

OTHER PUBLICATIONS

Thomas G. Barnes et al., Passbands for Acoustic Transmission in an Idealized Drill String, The Journal of the Acoustical Society of America, vol. 51, No. 5 (Part 2), pp. 1602-1608 (1972).

Douglas S. Drumheller; Acoustical Properties of Drill Strings, The Journal of the Acoustical Society of America, vol. 85, No. 3, Mar. 1989, pp. 1048-1064.

P R Paslay et al.; Drill Strings Vibrations Due to Intermittent Contact of Bit Teeth, Journal of Engineering for Industry, Transaction of the ASME, May 1963, pp. 187-194.

J. D. MacPherson et al.: Application and Analysis of Simultaneous Near Bit and Surface Dynamics Measurements, SPE 74718, Revised from SPE 39397, presented at the 1998 IADC/SPE Drilling Conference, Dallas, Mar. 3-6; Society of Petroleum Engineers. Dec. 2001. pp. 230-238.

* cited by examiner

METHOD OF DETECTING SIGNALS IN ACOUSTIC DRILL STRING TELEMETRY

CROSS REFERENCE TO RELATED APPLICATIONS

This application is a continuation of U.S. patent application Ser. No. 10/412,915, filed Apr. 14, 2003.

BACKGROUND OF THE INVENTION

1. Field of the Invention

This invention is in the field of signal processing, and is more specifically directed to acoustic drill string telemetry.

2. Description of the Related Art

The petroleum industry relies heavily on the operation of drilling into the earth, both on land and offshore, in the exploration for and production of petroleum products. Over the years, the more readily found and accessible petroleum reservoirs have of course been discovered and depleted first. As a result, the exploration and production operations must necessarily concentrate to a greater degree on less accessible and less readily discoverable reserves. In order to reach these locations, the depths of drilling have increased, the locations at which drilling takes place have become increasingly difficult and less accessible, and the drilling operations have necessarily become more complex. Accordingly, drilling operations in the search for and production of petroleum products have become more expensive, with this trend likely to continue in the future. Because of this increasing cost, the accuracy and efficiency of the drilling operation is becoming even more important.

The success and efficiency of the drilling operation depends to a large degree on the quantity and quality of information that the drilling operator has about the sub-surface structure into which the drilling is taking place, and also about parameters concerning the operation of the drill bit as it proceeds into the earth. Many techniques for acquisition and communication of such information have been tried and used in the industry.

A system which utilizes the drill string as a medium for the transmission of data is referred to as acoustic telemetry or stress wave telemetry. Acoustic telemetry systems are known in the art. For example U.S. Pat. No. 5,477,505 to Drumheller and U.S. Pat. No. 5,303,203 to Kingman describe such systems. The typical system includes transmitters, such as solenoids, eccentric motors, and piezoelectric transducers, which intentionally vibrate the drill string in a manner corresponding to the desired data. These data may include information concerning drilling parameters and formation parameters. In the case of stress wave telemetry the desired information is obscured by undesirable bit and drilling noise that is also transmitted through the drill string.

It has been discovered that vibrations, whether from the drill bit itself or intentionally generated by transmitters, are not communicated through the drill string in an ideal manner, due to the non-ideal response of the drill string to such vibrations. Conventional drill strings, which consist of a number of lengths of drill pipe joined by pipe joints, inherently have frequency domain stopbands that attenuate acoustical signals at the stopband frequencies. This frequency-dependent attenuation can severely distort some signals. Other factors also distort the vibrations communicated along a drill string from downhole to the surface. Such factors include noise generated by the drilling fluid, or mud, which is conventionally pumped through the drill string at relatively high pressures. This high pressure flow of fluid causes significant vibrations in the drill string. Other devices in the drilling operation, such as bearings in the swivels at the top of the drill string, the rattling of chains which turn the kelly bushing, or the motor in a top drive drilling arrangement, and the slap of the casing against the drill string or well bore, also generate significant acoustical vibrations which are received by and transmitted along the drill string. These vibrations are superimposed upon the desired data signal, and will accordingly be detected at the top of the drill string by such detectors as are attempting to detect the data signal transmitted from the downhole location.

Considering the vibrations generated by a transmitter as "signal" and the vibrations generated by the drill bit and the other vibrations caused by drilling mud flow and the mechanical sources discussed in the prior paragraph as "noise", it has been found that the amplitude of the noise can be substantially greater than the signal amplitude. Noise at this level not only clouds the analysis of the information, but indeed drowns out the information itself.

Vibration-state inference techniques have been described to determine downhole force and displacement at a position close to the bit from similar measurements at a second location in the drillstring, (see SPE 74718, Macpherson, et al., "Application and Analysis of Simultaneous Near Bit and Surface Dynamics Measurements", SPE Drilling and Completions, Society of Petroleum Engineers, December 2001). However, there is no suggestion therein of using such a technique for purposes of acoustic telemetry in a drillstring.

The methods of the present invention overcome the foregoing disadvantages of the prior art by providing a technique for removing a portion of the surface generated noise thereby improving the signal to noise ratio of acoustic signals transmitted along a drill string.

SUMMARY OF THE INVENTION

In one aspect, a method of acoustic telemetry in a drill string in a wellbore, comprises transmitting an acoustic signal related to a parameter of interest from a second transmitting location into the drill string. The signals propagated through the drill string are detected at a receiving location, where the detected signals include noise. A drill string transfer matrix is determined defining the propagation of signals through a transfer interval between the receiving location and the transmitting location. The detected signals and the drill string transfer matrix are used for obtaining an estimate of the acoustic signal.

In another aspect, a method of reducing noise in an acoustic signal transmitted at a second location and received at a first location in a drill string, comprises calculating a transfer matrix related to a transmission interval of the drill string. Time series data sets of vibrations are detected at the first location comprising a first time-series data set of measurements related to an acceleration of the drill string. The first time-series data set and the second time-series data set are transformed to a frequency domain. The transformed first time-series data set and the inferred force related signal at the second location are combined with the transfer function to generate an inferred force related signal at the second location and an inferred acceleration related signal at the second location. The inferred force related signal and the inferred acceleration related signal are transformed to the time domain generating an inferred time-series of force at the second location and an inferred time-series of acceleration at the second location.

Examples of the more important features of the invention thus have been summarized rather broadly in order that the detailed description thereof that follows may be better understood, and in order that the contributions to the art may be appreciated. There are, of course, additional features of the invention that will be described hereinafter and which will form the subject of the claims appended hereto.

BRIEF DESCRIPTION OF THE DRAWINGS

For detailed understanding of the present invention, references should be made to the following detailed description of the preferred embodiment, taken in conjunction with the accompanying drawings, in which like elements have been given like numerals, wherein.

DESCRIPTION OF PREFERRED EMBODIMENTS

Figure 1:
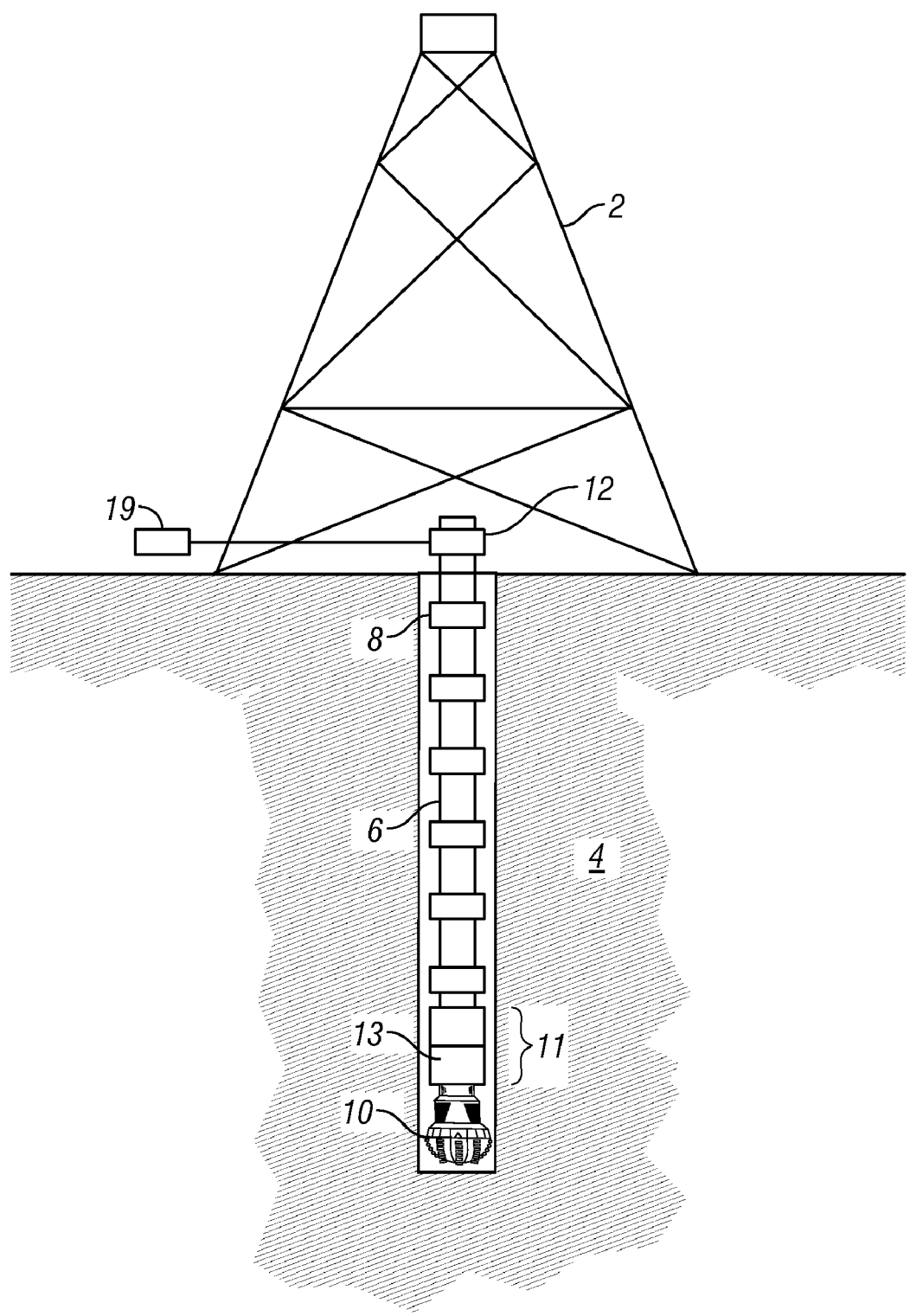
FIG. 1 is a schematic of a drilling system for use with a method according to one embodiment of the present invention.

Referring now to FIG. 1, a conventional drilling rig 2 is shown powering drill string 4, which conventionally consists of multiple sections of drill pipe 6 and a bottomhole assembly 11. Sections 6 are connected to one another by tool joints 8 in the conventional manner. Drill bit 10 is connected at the bottom end of drill string 4, and can be a rotary bit, jet or spud bit, or other type of drill bit conventional in the art. As shown in FIG. 1 drill bit 10 is connected to bottomhole assembly 11, which in turn is connected to sections 6 of drill string 4. The bottomhole assembly 11 is typically made up of multiple sections (not shown) of drill collars having a substantially larger diameter than that of the drill pipe 6. Provision of such a bottomhole assembly 11 is conventional in the drilling art, and is useful for housing such equipment as detectors for sensing parameters of interest of the drilling operation and the surrounding formation, as well as for other conventional functions. While such a bottomhole assembly 11 is shown in FIG. 1, it should be noted that the presence of bottomhole assembly 11 is not required for purposes of the instant invention, such presence depending upon the particular drilling operation being performed. However, for purposes of acoustic telemetry as will be described hereinbelow, an acoustic transmitter 13 for vibrating drill string 4, according to information to be transmitted from downhole to the surface, is preferably located in such a bottomhole assembly 11. Alternatively, the acoustic transmitter 13 may be located at other locations in the drill string 4.

In one preferred embodiment, the acoustic transmitter 13 excites axial vibration modes. Alternatively, the acoustic transmitter may excite torsional vibration modes and a combination of torsional and axial vibration modes. Such transmitter devices are known in the art and will not be described here further.

Detector sub 12 is connected within drill string 4 near the surface of the earth. Sub 12 contains detectors, such as force transducers, accelerometers, strain gages, piezoelectric transducers, optical transducers, and the like, for detecting stress and motion related to vibrations in drill string 4 and generating electrical signals corresponding to the detected vibration-induced parameters. The electrical signals generated from the detectors within sub 12 are communicated to computer system 19. Computer system 19 analyzes the signals corresponding to the vibrations of drill string 4 to remove a portion of the unwanted noise signals to enable enhanced decoding of the downhole transmitted information relating to the downhole measured data, according to one preferred embodiment of the invention described hereinbelow.

The drill bit 10 generates vibrational noise as the bit 10 disintegrates the formation. This noise propagates up the drill string 4 and mixes with the vibrationally encoded data signal generated by transmitter 13. In addition, drilling rig noise is generated and transferred to the drill string 4 at the surface. Both the surface generated noise and the downhole generated noise are received along with the data signal at sub 12. The method described below is useful in removing a portion of the surface generated noise for enhancing detection of the data signal transmitted downhole. Other techniques known in the art may be used for minimizing the downhole generated noise.

The present invention uses vibration-state inference to estimate the vibration state at one location in the drill string from vibration measurements made at another location in the same drill string. The objective is to remove the influence of unwanted vibration sources (noise) on the measurements while correcting for changes made to the signal by the transmission path (the drill string). In a typical preferred embodiment, the measurement location is at the surface and the inference position is at the downhole transmitter. Alternatively, in another preferred embodiment, for transmission of command signals to a downhole tool, the surface may be the inferred position and the measurements may be made at a downhole location.

Vibration-state inference requires determining both stress (either axial or torsional), and motion in the drill string 4. The determination of stress (axial and torsional) is commonly accomplished by determining a related strain with strain gages (not shown) or force measuring devices known in the art. For purposes of the following discussion and theoretical analysis, strain and stress are to be considered interchangeable indications for stress in the drill string 4. The motion measurement typically detects displacement, velocity, or acceleration of the drill string 4. Both axial and torsional (or rotational) motions may be detected. One skilled in the art will recognize that accelerometer and velocity measurements can be related to displacement using common techniques. For purposes of the following discussion and theoretical analysis, acceleration, displacement, and velocity are to be considered interchangeable indications for motion of the drill string 4.

Vibration-state inference relies on the knowledge of the mechanical system between the position of measurement and the position of inference, called the transmission interval, and the assumption that there is no externally applied excitation within the transmission interval. Of major utility is that the vibration-state inference technique does not depend on knowledge outside the transmission interval. Therefore, knowledge (or measurement) of the top and bottom boundary conditions (noise of the drill bit and surface equipment) of the drill string are not needed.

Theory:

The equation of motion for longitudinal vibrations of a uniform drill string is $$\rho A \frac{\partial^2 u(x,t)}{\partial t^2} + \mu \frac{\partial u(x,t)}{\partial t} - EA \frac{\partial^2 u(x,t)}{\partial x^2} = 0 \tag{1}$$

Therefore, $$\frac{\partial^2 u(x,t)}{\partial t^2} + \frac{\mu}{\rho A} \frac{\partial u(x,t)}{\partial t} - c_0^2 \frac{\partial^2 u(x,t)}{\partial x^2} = 0 \tag{2}$$

-continued $$c_0^2 = \frac{E}{\rho} \quad (3)$$

In the above equations, function u(x,t) represents the displacement, A the cross sectional area, ρ the mass density of the material of the drill string, μ the damping coefficient, $c_0$ the velocity of longitudinal waves and E is the Young's modulus.

Consider solutions of the form $$u(x,t) = u_0(x)e^{j\omega t} \quad (4)$$

On substituting equation 4 in equation 3

$$\left[-\omega^2 + j\frac{\mu\omega}{\rho A}\right]u_0 - c_0^2 \frac{d^2 u_0}{dx^2} = 0 \quad (5)$$

$$\frac{d^2 u_0}{dx^2} + \frac{\omega^2}{c_0^2}\left(1 - j\frac{\mu}{\rho A \omega}\right)u_0 = 0$$

The unknown complex function $u_0(x)$ therefore satisfies the equation of the form $$\frac{d^2 u_0}{dx^2} + k^2 u_0 = 0 \quad (6)$$

where, $$k^2 = \frac{\omega^2}{c_0^2}\left(1 - j\frac{\mu}{\rho A \omega}\right) \quad (7)$$

The solution of equation 6 is $$u_0 = A_1 \sin(kx) + B_1 \cos(kx) \quad (8)$$

The force $f_0$ is given by $$f_0 = EA \frac{\partial u_0}{\partial x} \quad (9)$$

$$= EAk[A_1 \cos(kx) - B_1 \sin(kx)] \quad (10)$$

Consider the following boundary conditions:
At the top (x=0), using equation 8, the displacement $u_s$ is $$u_s = u_0|_{x=0} = B_1 \quad (11)$$

and using equation 10, the force $f_0$ at x=0 is $$f_s = f_0|_{x=0} = EAk A_1 \quad (12)$$

Similarly, at a downhole location l feet away (x=l), the displacement $u_d$ is $$u_d = u_0|_{x=l} = A_1 \sin(kl) + B_1 \cos(kl) \quad (13)$$

and the force $f_d$ at x=l is $$f_d = f_0|_{x=l} = EAk[A_1 \cos(kl) - B_1 \sin(kl)] \quad (14)$$

The four equations 11-14 can be used to obtain the displacement and force ($u_d$ & $f_d$) at downhole location in terms of the measured displacement and force ($u_s$ & $f_s$) at the surface location as follows:

Substitute $A_1$ & $B_1$ from equations 11 & 12 into equation 13

$$u_d = \frac{1}{EAk}\sin(kl)f_s + \cos(kl)u_s \quad (15)$$

$$f_d = \cos(kl)f_s - EAk\sin(kl)u_s \quad (16)$$

From equation 4 it can be easily seen that the velocity (v) and acceleration (a) are given by $$v = \frac{du}{dt} = j\omega u_0(x)e^{j\omega t}$$

$$a = \frac{d^2 u}{dt^2} = -\omega^2 u_0(x)e^{j\omega t} \quad (17)$$

Equation 15 and 16 can therefore, be expressed in terms of velocity $v_d$ & $v_s$ as $$v_d = \frac{j\omega}{EAk}\sin(kl)f_s + \cos(kl)v_s \quad (18)$$

$$f_d = \cos(kl)f_s - \frac{EAk}{j\omega}\sin(kl)v_s \quad (19)$$

and, in terms of acceleration $a_d$ & $a_s$ as $$a_d = \frac{-\omega^2}{EAk}\sin(kl)f_s + \cos(kl)a_s \quad (20)$$

$$f_d = \cos(kl)f_s + \frac{EAk}{\omega^2}\sin(kl)a_s \quad (21)$$

The above equations can be expressed in the matrix form as follows $$\begin{bmatrix} u_d \\ f_d \end{bmatrix} = \begin{bmatrix} \cos(kl) & \frac{\sin(kl)}{EAk} \\ -EAk\sin(kl) & \cos(kl) \end{bmatrix}\begin{bmatrix} u_s \\ f_s \end{bmatrix} \quad (22)$$

$$\begin{bmatrix} v_d \\ f_d \end{bmatrix} = \begin{bmatrix} \cos(kl) & \frac{j\omega}{EAk}\sin(kl) \\ -\frac{EAk}{j\omega}\sin(kl) & \cos(kl) \end{bmatrix}\begin{bmatrix} v_s \\ f_s \end{bmatrix} \quad (23)$$

$$\begin{bmatrix} a_d \\ f_d \end{bmatrix} = \begin{bmatrix} \cos(kl) & \frac{-\omega^2}{EAk}\sin(kl) \\ \frac{EAk}{\omega^2}\sin(kl) & \cos(kl) \end{bmatrix}\begin{bmatrix} a_s \\ f_s \end{bmatrix} \quad (24)$$

Equations 24 can be written in the following general form:

$$\begin{bmatrix} a_d \\ f_d \end{bmatrix} = \begin{bmatrix} T_{11} & T_{12} \\ T_{21} & T_{22} \end{bmatrix}\begin{bmatrix} a_s \\ f_s \end{bmatrix} \quad (28)$$

where $$T_{11} = T_{22} = \cos(kl), \quad (28a)$$

$$T_{12} = -\frac{\omega^2}{EAk}\sin(kl)$$

and $$T_{21} = \frac{EAk}{\omega^2}\sin(kl)$$

In equation 24, the vector $$\begin{bmatrix} a_d \\ f_d \end{bmatrix},$$

which is a column matrix of acceleration (displacement or velocity) and internal force, is known as the state vector. Equation 24 shows that the state vector at a surface location s is transferred to the state vector at the downhole location d at distance l, through the square matrix, which is known as the transfer matrix. It is a function of the elastic and dynamic properties of the drill string system and frequency. Therefore, for known values of the state vector at the surface and a chosen value of frequency, $\omega$, it is possible to infer (or compute) the state vector at the downhole location, for known properties of the drill string.

As is commonly known, a typical drill string comprises drill collars and drill pipe sections with varying lengths and diameters. For a series of varying tubulars, each characterized by its own transfer matrix, $T_1, T_2, T_3, \ldots T_n$, the transfer matrix representing the effect of all the tubulars connected end-to-end is: $[T_n] \cdot [T_{n-1}] \cdot [T_{n-2}] \cdot \ldots \cdot [T_1]$. For the extreme ends of the transmission interval, for example end a and end b with a system of n connected tubulars;

$$\begin{bmatrix} ub \\ Fb \end{bmatrix} = [[Tn]\ldots [T3][T2][T1]] \begin{bmatrix} ua \\ Fa \end{bmatrix} \quad (29)$$

Note that in matrix algebra $[A][B] \neq [B][A]$, therefore order is important in calculating the system transfer matrix. The calculation starts multiplying transfer matrices from the inference end, not from the measurement end.

Sign Convention:

Using a right handed coordinate system, with x axis coinciding with the axis of the tubular, the face with outward normal pointing in the positive direction of the x-axis, represents the positive face of the section. In this arrangement, the displacements are positive if they coincide with the positive direction of the coordinate system and forces are positive when acting on the positive face with vector direction pointing in the positive direction.

The results in equation 28 represent the transfer matrix for the case where the direction is from upper (or surface) to lower end (downhole), i.e. for estimating force and displacement at the lower end (downhole) using known (measured) forces and acceleration at the surface (or upper end). In essence, the signal transmitted from a downhole transmitter can be inferred from surface force and displacement measurements.

Evaluation of k:

From equation 7, k can be expressed as $$k = \frac{\omega}{c_0} \sqrt{\left(1 - \frac{\mu}{\rho A \omega}j\right)} \quad (30)$$

It can be shown that (for example, see Kolsky, H., *Stress Waves in Solids*, Ch. 5, Dover Publications, Inc, 1963)

$$\frac{\mu}{\rho A} = 2\alpha c_0 \quad (31)$$

Where $\alpha$ is the attenuation coefficient. Also, $$\alpha = \frac{\omega}{2Qc_0} \quad (32)$$

On substituting equations 31 and 32 into equation 30 therefore $$k = \frac{\omega}{c_0} \sqrt{\left(1 - \frac{1}{Q}j\right)} \quad (33)$$

where Q is a quality factor representing the sharpness of a resonance peak of the vibrational system.

The solution to Equations 22-24 and equations 28 and 29 can be easily obtained using a computer using techniques known in the art.

The above inference-state analysis is directed to longitudinal (axial) vibrations, but is also valid for torsional vibrations by making the following substitutions into the above equations;

replace

E by G, the shear modulus;

u by $\theta$, the angular displacement;

f by T, torque;

A by $I_p$, the polar moment of inertia; and $c_t^2 = G/\rho$, the shear wave velocity.

Also note that the above analysis concerns steady-state conditions or frequency domain operations only. However, steady-state conditions are not required. Time-domain (arbitrary/non-periodic) signals may be analyzed as well if the initial (time zero) vibration state at the inference point is known. Many time-frequency domain transformation algorithms, for example discrete Fourier transforms an Fast-Fourier transforms implicitly assume that the time data signal, or record, is periodic (i.e. that it repeats itself indefinitely). Real world signals, however, are commonly finite in length. Techniques are known in the art to deal with data that are not truly periodic while still enjoying the utility of digital transform methods. One method involves "windowing" the finite length record. This technique essentially taoers the beginning and ending segments of the record such that it may be considered to be periodic. Various window functions are known in the art and include, but are not limited to, (i) Hanning, (ii) Hamming, and (iii) Blackman. The use of such techniques yield results for the finite length signal record that approximate the spectral characteristics of a periodic signal with similar characteristics.

Figure 2:
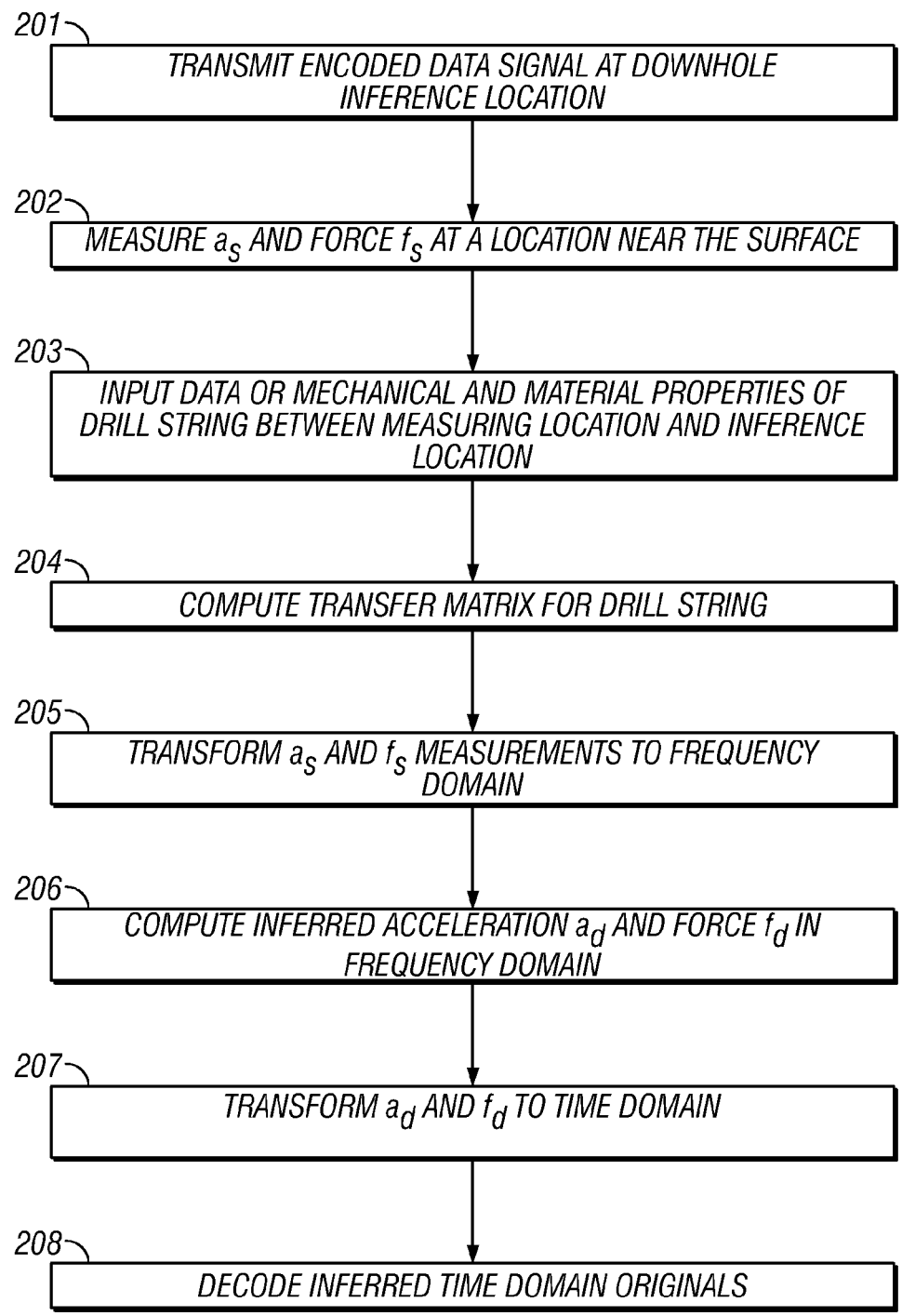
FIG. 2 is a block diagram of a frequency-domain method according to one embodiment of the present invention.

In a frequency domain operational example, shown in block diagram form in FIG. 2, in 201, downhole transmitter 13 imparts encoded data signals into the drill string 4 that travel through the drill string 4 toward the surface. In 202, the drill string acceleration $a_s$ and drill string force $f_s$ are measured at surface receiver 12 and input as time-series data to computer system 19 for analysis. In 203, mechanical data, such as lengths and diameters, and mechanical properties, such as density and elastic modulus, are input for each drill string section between the measuring location and the downhole inference location at transmitter 13. The mechanical data and mechanical properties are used to compute a transfer matrix using the techniques described herein, see 204. In 205, the acceleration and force time-series data are transformed to the frequency domain using techniques known in the art, such as the Fourier transform. In 206, the transformed acceleration and force measurements are multiplied, in the frequency domain, by the transfer matrix as described previously to calculate an inferred acceleration and inferred force, in the frequency domain, at the downhole inference location at transmitter 13. In 207, the frequency domain inferred downhole acceleration and inferred downhole force are transformed back to the time domain using Fourier transform, or equivalent techniques, thereby generating inferred acceleration and force time-series data that can be decoded in step 208 to yield the downhole encoded and transmitted data. The sequence described above relates to data sent from a downhole location to a surface location but could also be used for transmitting data from a surface location to a downhole location.

Figure 3:
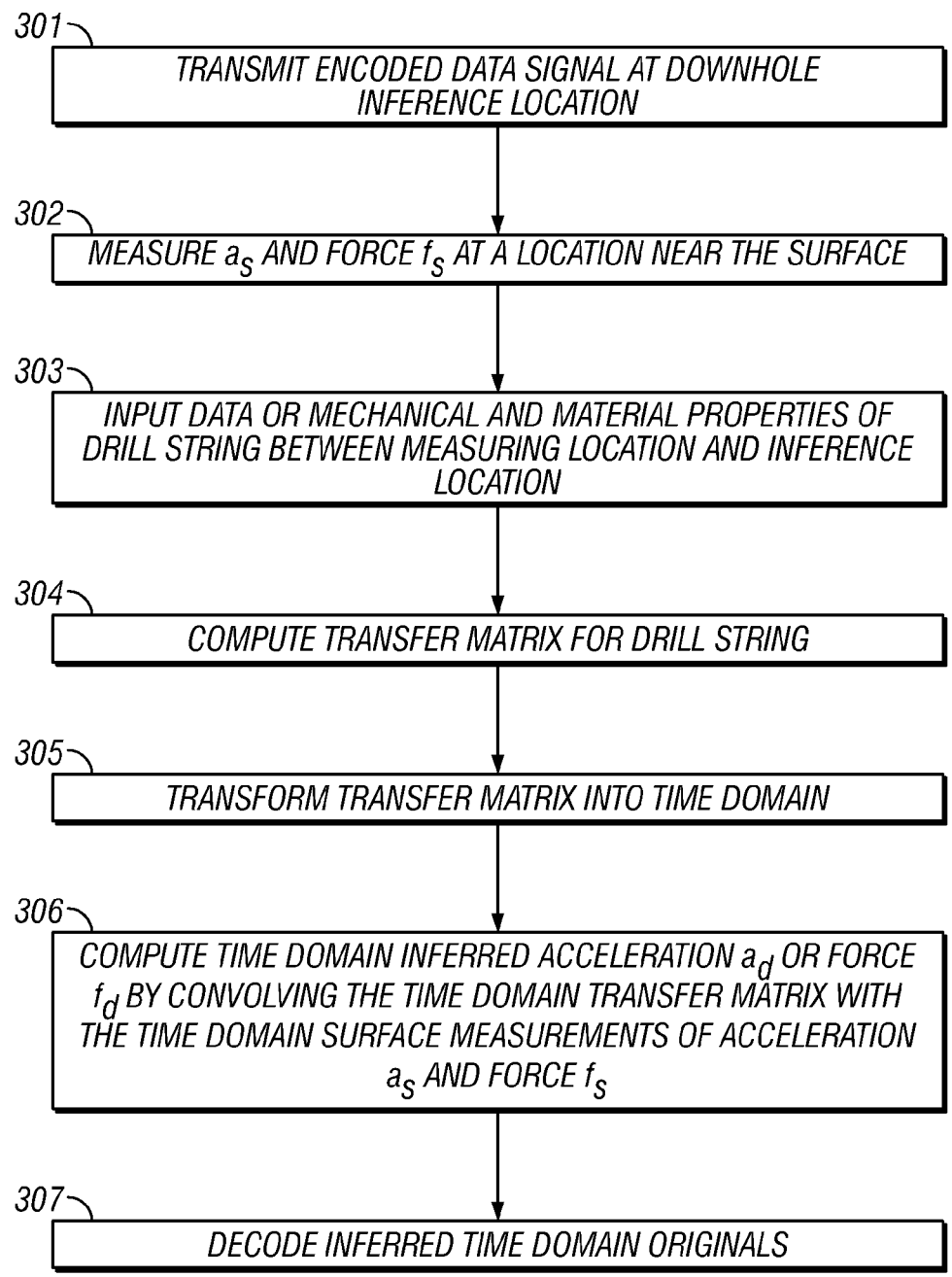
FIG. 3 is a block diagram of a time-domain method according to one embodiment of the present invention.

Alternatively, in a time domain operational example, shown in block diagram form in FIG. 3, in 301, downhole transmitter 13 imparts encoded data signals into the drill string 4 that travel through the drill string 4 toward the surface. In 302, the drill string acceleration $a_s$ and drill string force $f_s$ are measured at surface receiver 12 and input as time-series data to computer system 19 for analysis. In 303, mechanical data, such as lengths and diameters, and mechanical properties, such as density and elastic modulus, are input for each drill string section between the measuring location and the downhole inference location at transmitter 13. The mechanical data and mechanical properties are used to compute a transfer matrix using the techniques described herein, see 304. In 305, the frequency dependent transfer matrix is transformed to the time domain using techniques known in the art, such as the Fourier transform. One skilled in the art will appreciate that just as the time domain signal must be shaped or windowed to provide acceptable results, so to the frequency signal must be shaped, for example, by band-limiting the approximate a periodic signal, when transformed. In 306, the acceleration and force measurements are combined with the transfer matrix using standard convolution methods to calculate an inferred acceleration and inferred force, in the time domain, at the downhole inference location at transmitter 13, thereby generating inferred acceleration and force time-series data that can be decoded in step 207 to yield the downhole encoded and transmitted data. The sequence described above relates to data sent from a downhole location to a surface location but could also be used for transmitting data from a surface location to a downhole location.

A major advantage in using the transfer matrix method is that a large. complex system can be broken down into its components with simple elastic and dynamic properties. Calculations can be then made, by proceeding from one component to the other, starting from one end of the first component to the next and so on. In a drill string, the subsystems can be drill pipes, drill collars, etc. with different dimensions and material properties. This technique is computationally more efficient than solving such a system using other common techniques such as finite element methods.

In the method discussed above, it has been shown (using equation 24) that it is possible to infer or estimate the motion (i.e. displacement, velocity or acceleration) and force (or stress) at one location from known (measured) motion and stress at another location thereby enabling improved acoustic drill string telemetry. The knowledge of boundary conditions or noise sources outside the interval between the measurement point and the inference point is not needed.

The foregoing description is directed to particular embodiments of the present invention for the purpose of illustration and explanation. It will be apparent, however, to one skilled in the art that many modifications and changes to the embodiment set forth above are possible without departing from the scope and the spirit of the invention. It is intended that the following claims be interpreted to embrace all such modifications and changes.

What is claimed is:

1. A method of acoustic telemetry in a drill string in a wellbore, comprising:
   transmitting a coded acoustic signal related to a parameter of interest from a transmitting location into the drill string;
   detecting the coded acoustic signal at a receiving location;
   detecting signals at the receiving location, the detected signals including (i) a first time-series of measurements related to force applied to the drill string at the receiving location, and (ii) a second time-series of measurements related to motion of the drill string at the receiving location, said detected signals including noise from the receiving location;
   determining a drill string transfer matrix defining propagation of signals through a transfer interval between the receiving location and the transmitting location;
   determining a time-series related to acceleration at the transmitter location and a time-series related to motion at the transmitter location using the detected signals and the drill string transfer matrix; and
   estimating the coded acoustic signal using the determined time-series related to acceleration at the transmitter location and determined time-series related to motion at the transmitter location.

2. The method of claim 1 wherein estimating the coded acoustic signal comprises:
   transforming the first time-series of measurements at the receiving location and the second time-series of measurements at the receiving location to a frequency domain;
   combining the transformed first time-series of measurements and the transformed second time-series of measurements with the transfer matrix to generate an inferred force related signal at the transmitting location and an inferred motion related signal at the transmitting location;
   transforming said inferred force related signal and the inferred motion related signal to the time domain generating an inferred time-series force signal at the transmitting location and an inferred time-series motion signal at the transmitting location; and
   decoding the inferred force signal and the inferred motion signal to determine the transmitted parameter of interest.

3. The method of claim 1 wherein determining the drill string transfer matrix comprises:
   i. inputting data related to mechanical properties and material properties for each of a plurality of sections of the drill string;
   ii. calculating for each of the plurality of sections of the drill string, a transfer matrix related to each section of the drill string; and
   iii. combining each of the plurality of section transfer matrices with each succeeding section transfer matrix.

4. The method of claim 1 wherein the transmitting location is a downhole location proximate a bottom end of the drill string and the receiving location is proximate a top end of the drill string.

5. The method of claim 1 wherein the transmitting location is proximate a top end of the drill string and the receiving location is downhole proximate a bottom end of the drill string.

6. The method of claim 1, wherein the measurement related to drill string motion is one of (i) an acceleration, (ii) a velocity, and (iii) displacement.

7. The method of claim 1 wherein estimating the coded acoustic signal comprises:
   i. transforming said transfer matrix to a time domain;
   ii. combining the first time-series of measurements and the second time-series of measurements with the transformed transfer matrix to generate an inferred force related signal at the transmitting location and an inferred motion related signal at the transmitting location; and
   iii. decoding the inferred force signal and the inferred motion signal to determine the transmitted parameter of interest.

8. The method of claim 2, wherein the step of transforming said first time-series of measurements and said second time-series of measurements includes windowing said first time-series of measurements with said second time-series of measurements.

9. The method of claim 2, wherein the step of transforming said inferred force related signal and said inferred motion related signal to the time domain includes band-limiting said inferred force related signal and said inferred motion related signal in the frequency domain before transformation to the time domain.

10. A method of reducing noise in a coded acoustic signal ransmitted at a second location and detected at a first location in a drill string, comprising:
    calculating a drill string transfer matrix related to a transmission interval of the drill string;
    detecting time-series data sets of vibrations at the first location comprising a first time-series data set of measurements related to a force applied on said drill string at the first location and a second time-series measurement data set of measurements related to an acceleration at the first location of the drill string, wherein the time-series data sets include noise from the first location;
    transforming the first time-series data set and said second time-series data set to a frequency domain;
    combining the transformed first time-series data set and the transformed second time-series data set with the transfer function to generate an inferred force related signal at the second location and an inferred acceleration related signal at the second location;
    transforming the inferred force related signal and the inferred acceleration related signal to a time domain, generating an inferred time-series of force at the second location and an inferred time-series of acceleration at the second location; and
    using the inferred time-series of force and the inferred time-series of acceleration to reduce the noise in the coded acoustic signal.

11. The method of claim 10 wherein calculating the drill string transfer matrix comprises:
    i. calculating for each of a plurality of drill string sections a transfer matrix related to each section of the drill string; and
    ii. combining each of the plurality of section transfer matrices with each succeeding section transfer matrix.

12. The method of claim 10 wherein the second location is a downhole location proximate a bottom end of the drill string and the first location is proximate a top end of the drill string.

13. The method of claim 10 wherein the second location is proximate a top end of the drill string and the first location is downhole proximate a bottom end of the drill string.

* * * * *